United States Patent
Suzuki et al.

(10) Patent No.: US 10,703,166 B2
(45) Date of Patent: Jul. 7, 2020

(54) AIR CONDITIONER FOR VEHICLE

(71) Applicant: SANDEN AUTOMOTIVE CLIMATE SYSTEMS CORPORATION, Isesaki-shi (JP)

(72) Inventors: Kenichi Suzuki, Isesaki (JP); Ryo Miyakoshi, Isesaki (JP); Kohei Yamashita, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 204 days.

(21) Appl. No.: 15/738,746

(22) PCT Filed: Jun. 7, 2016

(86) PCT No.: PCT/JP2016/066849
§ 371 (c)(1),
(2) Date: Dec. 21, 2017

(87) PCT Pub. No.: WO2017/002546
PCT Pub. Date: Jan. 5, 2017

(65) Prior Publication Data
US 2018/0194191 A1   Jul. 12, 2018

(30) Foreign Application Priority Data

Jul. 1, 2015   (JP) .................................. 2015-132948

(51) Int. Cl.
*B60H 1/00* (2006.01)
*F25B 1/00* (2006.01)
(Continued)

(52) U.S. Cl.
CPC ..... *B60H 1/00028* (2013.01); *B60H 1/00385* (2013.01); *B60H 1/00392* (2013.01);
(Continued)

(58) Field of Classification Search
CPC .............. F25B 2500/26; F25B 2600/02; F25B 2600/0272; F25B 2600/0253; F25B 2700/21151; F25B 2700/1933
(Continued)

(56) References Cited

U.S. PATENT DOCUMENTS

| 5,088,298 | A  | * | 2/1992 | Fujii | ..................... | B60H 1/321 |
|           |    |   |        |       |                      | 62/158     |
| 2010/0178175 | A1 | * | 7/2010 | Koyama | ............. | F04C 18/0215 |
|           |    |   |        |       |                      | 417/12     |
| 2015/0298525 | A1 | * | 10/2015 | Miyakoshi | ............ | F25B 49/005 |
|           |    |   |        |       |                      | 62/160     |

FOREIGN PATENT DOCUMENTS

| CN | 1266975  | 9/2000 |
| CN | 101408355 | 4/2009 |

(Continued)

OTHER PUBLICATIONS

JP2003200730 English Translation.*

(Continued)

*Primary Examiner* — Marc E Norman
*Assistant Examiner* — Schyler S Sanks
(74) *Attorney, Agent, or Firm* — Cozen O'Connor

(57) ABSTRACT

Air conditioner for a vehicle in which low pressure protection is accurately performed to improve reliability. A controller adjusts a number of revolution Nc of a compressor 2 so that a detected value does not decrease below a limiting target value TGTs, on the basis of the detected value of a suction temperature sensor and a limiting target value TGTs set to a suction refrigerant temperature of the compressor 2. The controller has a predetermined limiting lower limit TGTsL and a predetermined limiting upper limit TGTsH which is higher than the predetermined limiting lower limit, and adjusts the number of revolution Nc of compressor 2 so that the limiting target value TGTs is the limiting upper limit (Continued)

TGTsH on startup of compressor 2, and the controller gradually decreases the limiting target value TGTs toward the limiting lower limit TGTsL, when the detected value decreases to the limiting upper limit TGTsH.

5 Claims, 10 Drawing Sheets

(51) Int. Cl.
  *F25B 49/02* (2006.01)
  *B60H 1/32* (2006.01)
  *B60H 1/22* (2006.01)
  *F25B 40/00* (2006.01)
  *F25B 6/04* (2006.01)
  *F25B 5/04* (2006.01)

(52) U.S. Cl.
  CPC ..... *B60H 1/00785* (2013.01); *B60H 1/00914* (2013.01); *B60H 1/00921* (2013.01); *B60H 1/2218* (2013.01); *B60H 1/3216* (2013.01); *B60H 1/3225* (2013.01); *F25B 1/00* (2013.01); *F25B 49/02* (2013.01); *F25B 49/022* (2013.01); *B60H 2001/325* (2013.01); *B60H 2001/3272* (2013.01); *F25B 5/04* (2013.01); *F25B 6/04* (2013.01); *F25B 40/00* (2013.01); *F25B 2400/0403* (2013.01); *F25B 2400/0409* (2013.01); *F25B 2400/0411* (2013.01); *F25B 2500/19* (2013.01); *F25B 2500/26* (2013.01); *F25B 2600/0253* (2013.01); *F25B 2600/0272* (2013.01); *F25B 2700/1933* (2013.01); *F25B 2700/2106* (2013.01); *F25B 2700/21151* (2013.01)

(58) Field of Classification Search
  USPC ........................................................ 62/228.3
  See application file for complete search history.

(56) References Cited

FOREIGN PATENT DOCUMENTS

| | | | |
|---|---|---|---|
| CN | 101451774 | 6/2009 | |
| JP | 2-230056 | 9/1990 | |
| JP | 6-255354 | 9/1994 | |
| JP | 7-186706 | 7/1995 | |
| JP | 8-282253 | 10/1996 | |
| JP | 9-126601 | 5/1997 | |
| JP | 2003-200730 | 7/2003 | |
| JP | 2003200730 A * | 7/2003 | ............ B60H 1/005 |
| JP | 2006-64378 | 3/2006 | |
| JP | 3985384 | 7/2007 | |
| JP | 2014-62657 | 4/2014 | |
| JP | 2014-172478 | 9/2014 | |
| JP | 2014-196893 | 10/2014 | |
| JP | 2014-231262 | 12/2014 | |
| WO | WO-2014073689 A1 * | 5/2014 | ............ F25B 49/005 |

OTHER PUBLICATIONS

Notice of Reasons for Refusal dated Jun. 18, 2019 issued in Japanese Patent Application No. 2015-132948.
Office Action dated Jul. 15, 2019 issued in Chinese Patent Application No. 201680037892.X.

\* cited by examiner

AIR CONDITIONER FOR VEHICLE

RELATED APPLICATIONS

This is a U.S. National Phase Application under 35 USC 371 of International Application PCT/JP2016/066849 filed on Jun. 7, 2016.

This application claims the priority of Japanese application no. 2015-132948 filed Jul. 1, 2015, the entire content of which is hereby incorporated by reference.

TECHNICAL FIELD

The present invention relates to an air conditioner of a heat pump system which conditions air of a vehicle interior, and more particularly, it relates to an air conditioner for a vehicle which is suitable for a hybrid car or an electric vehicle.

BACKGROUND ART

Due to actualization of environmental problems in recent years, hybrid cars and electric vehicles have spread. Further, as an air conditioner which is applicable to such a vehicle, there has been developed an air conditioner including a compressor to compress and discharge a refrigerant, a radiator (a condenser) disposed on a vehicle interior side to let the refrigerant radiate heat, a heat absorber (an evaporator) disposed on the vehicle interior side to let the refrigerant absorb heat, and an outdoor heat exchanger disposed outside the vehicle interior to let the refrigerant radiate heat or absorb heat, and there are changed and executed respective modes of a heating mode to let the refrigerant discharged from the compressor radiate heat in the radiator and let the refrigerant from which the heat has been radiated in this radiator absorb heat in the outdoor heat exchanger, a dehumidifying and heating mode to let the refrigerant discharged from the compressor radiate heat in the radiator and let the refrigerant from which the heat has been radiated in the radiator absorb heat in the heat absorber, and a cooling mode to let the refrigerant discharged from the compressor radiate heat in the outdoor heat exchanger and let the refrigerant absorb heat in the heat absorber (e.g., see Patent Document 1).

CITATION LIST

Patent Documents

Patent Document 1: Japanese Patent No. 3985384

SUMMARY OF THE INVENTION

Problems to be Solved by the Invention

In such an air conditioner for a vehicle as described above, when a low pressure of a refrigerant circuit excessively lowers, there occurs the problem that a compressor or each low pressure side component of the refrigerant circuit is damaged. In particular, on startup of the compressor in a heating mode to be executed in a season in which an outdoor air temperature lowers, a number of revolution of the compressor rapidly increases, and hence the low pressure rapidly drops. To eliminate the problem, heretofore in this type of air conditioner for the vehicle, low pressure protection has been performed to adjust the number of revolution of the compressor so that a suction refrigerant temperature does not lower below a predetermined limiting target value, on the basis of the suction refrigerant temperature of the compressor (the suction refrigerant temperature is converted to a suction refrigerant pressure for judgment).

FIG. 10 is a diagram to explain such a conventional low pressure protection control. In this diagram, a lower limit suction temperature TLL is the suction refrigerant temperature corresponding to a compressor suction pressure (the suction refrigerant pressure) of, e.g., 0.01 MPaG, and has a value set in consideration of durability of the compressor or the low pressure side component. Furthermore, a protection stop value TLS is a suction refrigerant temperature to stop the compressor, and this protection stop value TLS is set to a value (TLS=TLL+2 deg.) which is higher than the lower limit suction temperature TLL as much as, e.g., an allowance of 2 deg. in consideration of accuracy of a suction temperature sensor which detects the suction refrigerant temperature of the compressor.

Furthermore, a limiting target value TGTs is a target value of the suction refrigerant temperature which limits the number of revolution of the compressor, and is set to a value (fixed to TGTs=TLS+3 deg.) which is higher than the protection stop value TLS as much as, e.g., an allowance of 3 deg. in consideration of overshoot of controlling and response delay of the suction temperature sensor. Then, a controller of the air conditioner for the vehicle adjusts the number of revolution of the compressor so that this suction refrigerant temperature does not lower below the limiting target value TGTs, on the basis of the suction refrigerant temperature detected by the suction temperature sensor. Specifically, when the suction refrigerant temperature is to lower below the limiting target value TGTs, the controller decreases the number of revolution of the compressor, and adjusts the number of revolution of the compressor so that the suction refrigerant temperature reaches the limiting target value TGTs. Consequently, the compressor and the low pressure side components are protected while preventing the compressor from stopping as much as possible.

However, when the suction refrigerant pressure (the low pressure) rapidly drops on the startup of the compressor or the like, the suction temperature sensor cannot respond to (detect) the drop. When such response delay enlarges, the number of revolution of the compressor cannot be adjusted in time, and when the number of revolution of the compressor is only adjusted in accordance with the predetermined limiting target value TGTs as in a conventional technology, an actual suction refrigerant temperature (the suction refrigerant pressure) noticeably drops below the limiting target value TGTs, and drops in excess of the protection stop value TLS and down to the lower limit suction temperature TLL (overshoot). Consequently, in the conventional technology, the compressor operates at such a low pressure, thereby causing the problem that the compressor and the low pressure side components are damaged.

The present invention has been developed to solve such conventional technical problems, and an object thereof is to provide an air conditioner for a vehicle in which low pressure protection is accurately performed to improve reliability.

Means for Solving the Problems

An air conditioner for a vehicle of the invention of claim 1 includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, a detecting means for detecting a suction refrigerant temperature or a suction refrigerant pressure of the compressor, and a control means, so that this control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and the air conditioner for the vehicle is characterized in that the control means has a low pressure protecting function of adjusting a number of revolution of the compressor so that a detected value does not decrease below a limiting target value, on the basis of the detected value of the detecting means and the limiting target value set to the suction refrigerant temperature or the suction refrigerant pressure of the compressor, and the control means has a predetermined limiting lower limit and a predetermined limiting upper limit which is higher than the predetermined limiting lower limit, and adjusts the number of revolution of the compressor setting the limiting target value as the limiting upper limit on startup of the compressor, and the control means gradually decreases the limiting target value toward the limiting lower limit, when the detected value decreases to the limiting upper limit.

The air conditioner for the vehicle of the invention of claim 2 is characterized in that in the above invention, the control means decreases the limiting target value down to the limiting lower limit with a predetermined time constant of a first-order lag, when the detected value decreases to the limiting upper limit.

The air conditioner for the vehicle of the invention of claim 3 includes an auxiliary heating means disposed on an upstream side of the radiator to the flow of the air in the air flow passage in the above respective inventions, and is characterized in that the control means lets the auxiliary heating means generate heat on the startup of the compressor.

The air conditioner for the vehicle of the invention of claim 4 is characterized in that in the above respective inventions, the control means has revolution number limiting data indicating a relation between an outdoor air temperature and an upper limit number of revolution of the compressor at which the suction refrigerant temperature or the suction refrigerant pressure does not lower below the limiting lower limit at the outdoor air temperature, and the control means changes the upper limit number of revolution of the compressor on the basis of the outdoor air temperature with reference to this revolution number limiting data.

The air conditioner for the vehicle of the invention of claim 5 is characterized in that in the inventions of claim 1 to claim 3, the control means decreases an upper limit number of revolution of the compressor for a predetermined time after the startup of the compressor or when a high pressure is low.

An air conditioner for a vehicle of the invention of claim 6 includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an auxiliary heating means disposed on an upstream side of the radiator to the flow of the air in the air flow passage, an outdoor heat exchanger disposed outside the vehicle interior to let the refrigerant absorb heat, a detecting means for detecting a suction refrigerant temperature or a suction refrigerant pressure of the compressor, and a control means, so that this control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and the air conditioner for the vehicle is characterized in that the control means has a low pressure protecting function of adjusting a number of revolution of the compressor so that a detected value does not decrease below a limiting target value, on the basis of the detected value of the detecting means and the limiting target value set to the suction refrigerant temperature or the suction refrigerant pressure of the compressor, and the control means lets the auxiliary heating means generate heat on startup of the compressor.

An air conditioner for a vehicle of the invention of claim 7 includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, a detecting means for detecting a suction refrigerant temperature or a suction refrigerant pressure of the compressor, and a control means, so that this control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and the air conditioner for the vehicle is characterized in that the control means has a low pressure protecting function of adjusting a number of revolution of the compressor so that a detected value does not decrease below a limiting target value, on the basis of the detected value of the detecting means and the limiting target value set to the suction refrigerant temperature or the suction refrigerant pressure of the compressor, and the control means has revolution number limiting data indicating a relation between an outdoor air temperature and an upper limit number of revolution of the compressor at which the suction refrigerant temperature or the suction refrigerant pressure does not lower below the limiting target value at the outdoor air temperature, and changes the upper limit number of revolution of the compressor on the basis of the outdoor air temperature with reference to this revolution number limiting data.

An air conditioner for a vehicle of the invention of claim 8 includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, a detecting means for detecting a suction refrigerant temperature or a suction refrigerant pressure of the compressor, and a control means, so that this control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and the air conditioner for the vehicle is characterized in that the control means has a low pressure protecting function of adjusting a number of revolution of the compressor so that a detected value does not decrease below a limiting target value, on the basis of the detected value of the detecting means and the limiting target value set to the suction refrigerant temperature or the suction refrigerant pressure of the compressor, and the control means decreases an upper limit number of revolution of the compressor for a predetermined time after startup of the compressor or when a high pressure is low.

Advantageous Effect of the Invention

According to the invention of claim 1, an air conditioner for a vehicle includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, a detecting means for detecting a suction refrigerant temperature or a suction refrigerant pressure of the compressor, and a control means, so that this control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and in the air conditioner for the vehicle, the control means has a low pressure protecting function of adjusting a number of revolution of the compressor so that a detected value does not decrease below a limiting target value, on the basis of the detected value of the detecting means and the limiting target value set to the suction refrigerant temperature or the suction refrigerant pressure of the compressor, and the control means has a predetermined limiting lower limit and a predetermined limiting upper limit which is higher than the predetermined limiting lower limit, and adjusts the number of revolution of the compressor setting the limiting target value as the limiting upper limit on startup of the compressor, and the control means gradually decreases the limiting target value toward the limiting lower limit, when the detected value decreases to the limiting upper limit. Consequently, by setting the limiting lower limit to the above-mentioned conventional value of the limiting target value, the control means adjusts the number of revolution of the compressor under setting the limiting target value to the limiting upper limit which is higher than the limiting lower limit on the startup of the compressor.

Consequently, low pressure protection starts in a stage which is earlier than that in a conventional technology, and hence it is possible to effectively inhibit so-called overshoot of an actual suction refrigerant temperature or suction refrigerant pressure due to a response delay of the detecting means, and reliability of the compressor and low pressure side components can improve. Furthermore, the control means gradually decreases the limiting target value toward the limiting lower limit, when the detected value decreases to the limiting upper limit. Therefore, accurate low pressure protection is achievable without unnecessarily limiting the number of revolution of the compressor.

In this case, as in the invention of claim 2, the control means decreases the limiting target value down to the limiting lower limit with a predetermined time constant of a first-order lag, when the detected value decreases to the limiting upper limit. Consequently, it is possible to accurately decrease the limiting target value in accordance with drop of the actual suction refrigerant temperature or suction refrigerant pressure.

Furthermore, as in the invention of claim 3, when an auxiliary heating means is disposed on an upstream side of the radiator to the flow of the air in the air flow passage, the control means lets the auxiliary heating means generate heat on the startup of the compressor, thereby raising a high pressure and also raising a low pressure. Additionally, the number of revolution of the compressor also does not increase, and hence it is possible to inhibit rapid drop of the suction refrigerant temperature or the suction refrigerant pressure on the startup of the compressor, and further improvement of reliability is achievable.

In addition, as in the invention of claim 4, the control means has revolution number limiting data indicating a relation between an outdoor air temperature and an upper limit number of revolution of the compressor at which the suction refrigerant temperature or the suction refrigerant pressure does not lower below the limiting lower limit at the outdoor air temperature, and the control means changes the upper limit number of revolution of the compressor on the basis of the outdoor air temperature with reference to this revolution number limiting data. Consequently, it is possible to change the upper limit number of revolution of the compressor in accordance with the outdoor air temperature, and it is possible to further securely prevent the suction refrigerant temperature or the suction refrigerant pressure from lowering below the limiting lower limit.

On the other hand, as in the invention of claim 5, the control means decreases an upper limit number of revolution of the compressor for a predetermined time after the startup of the compressor or when a high pressure is low. Consequently, it is possible to eliminate the disadvantage that the number of revolution of the compressor excessively increases and that the suction refrigerant temperature or the suction refrigerant pressure rapidly drops below the limiting lower limit, on the startup or when the high pressure is low.

According to the invention of claim 6, an air conditioner for a vehicle includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an auxiliary heating means disposed on an upstream side of the radiator to the flow of the air in the air flow passage, an outdoor heat exchanger disposed outside the vehicle interior to let the refrigerant absorb heat, a detecting means for detecting a suction refrigerant temperature or a suction refrigerant pressure of the compressor, and a control means, so that this control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and in the air conditioner for the vehicle, the control means has a low pressure protecting function of adjusting a number of revolution of the compressor so that a detected value does not decrease below a limiting target value, on the basis of the detected value of the detecting means and the limiting target value set to the suction refrigerant temperature or the suction refrigerant pressure of the compressor, and the control means lets the auxiliary heating means generate heat on startup of the compressor. Consequently, due to the heating of the auxiliary heating means, the high pressure rises and a low pressure also rises. Furthermore, the number of revolution of the compressor also does not increase, and hence it is possible to inhibit rapid drop of the suction refrigerant temperature or the suction refrigerant pressure on the startup of the compressor, and improvement of reliability is achievable.

According to the invention of claim 7, an air conditioner for a vehicle includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, a detecting means for detecting a suction refrigerant temperature or a suction refrigerant pressure of the compressor, and a control means, so that this control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and in the air conditioner for the vehicle, the control means has a low pressure protecting function of adjusting a number of revolution of the compressor so that a detected value does not decrease below a limiting target value, on the basis of the detected value of the detecting means and the limiting target value set to the suction refrigerant temperature or the suction refrigerant pressure of the compressor, and the control means has revolution number limiting data indicating a relation between an outdoor air temperature and an upper limit number of revolution of the compressor at which the suction refrigerant temperature or the suction refrigerant pressure does not lower below the limiting target value at the outdoor air temperature, and changes the upper limit number of revolution of the compressor on the basis of the outdoor air temperature with reference to this revolution number limiting data. Consequently, it is possible to change the upper limit number of revolution of the compressor in accordance with the outdoor air temperature, and the suction refrigerant temperature or the suction refrigerant pressure is prevented from lowering below the limiting target value so that improvement of reliability is achievable.

According to the invention of claim 8, an air conditioner for a vehicle includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, a detecting means for detecting a suction refrigerant temperature or a suction refrigerant pressure of the compressor, and a control means, so that this control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and in the air conditioner for the vehicle, the control means has a low pressure protecting function of adjusting a number of revolution of the compressor so that a detected value does not decrease below a limiting target value, on the basis of the detected value of the detecting means and the limiting target value set to the suction refrigerant temperature or the suction refrigerant pressure of the compressor, and the control means decreases an upper limit number of revolution of the compressor for a predetermined time after startup of the compressor or when a high pressure is low. Consequently, it is possible to eliminate the disadvantage that the number of revolution of the compressor excessively increases and that the suction refrigerant temperature or the suction refrigerant pressure rapidly drops below the limiting target value, on the startup or when the high pressure is low, and improvement of reliability is achievable.

MODE FOR CARRYING OUT THE INVENTION

Hereinafter, description will be made as to embodiments of the present invention in detail with reference to the drawings.

Embodiment 1

Figure 1:
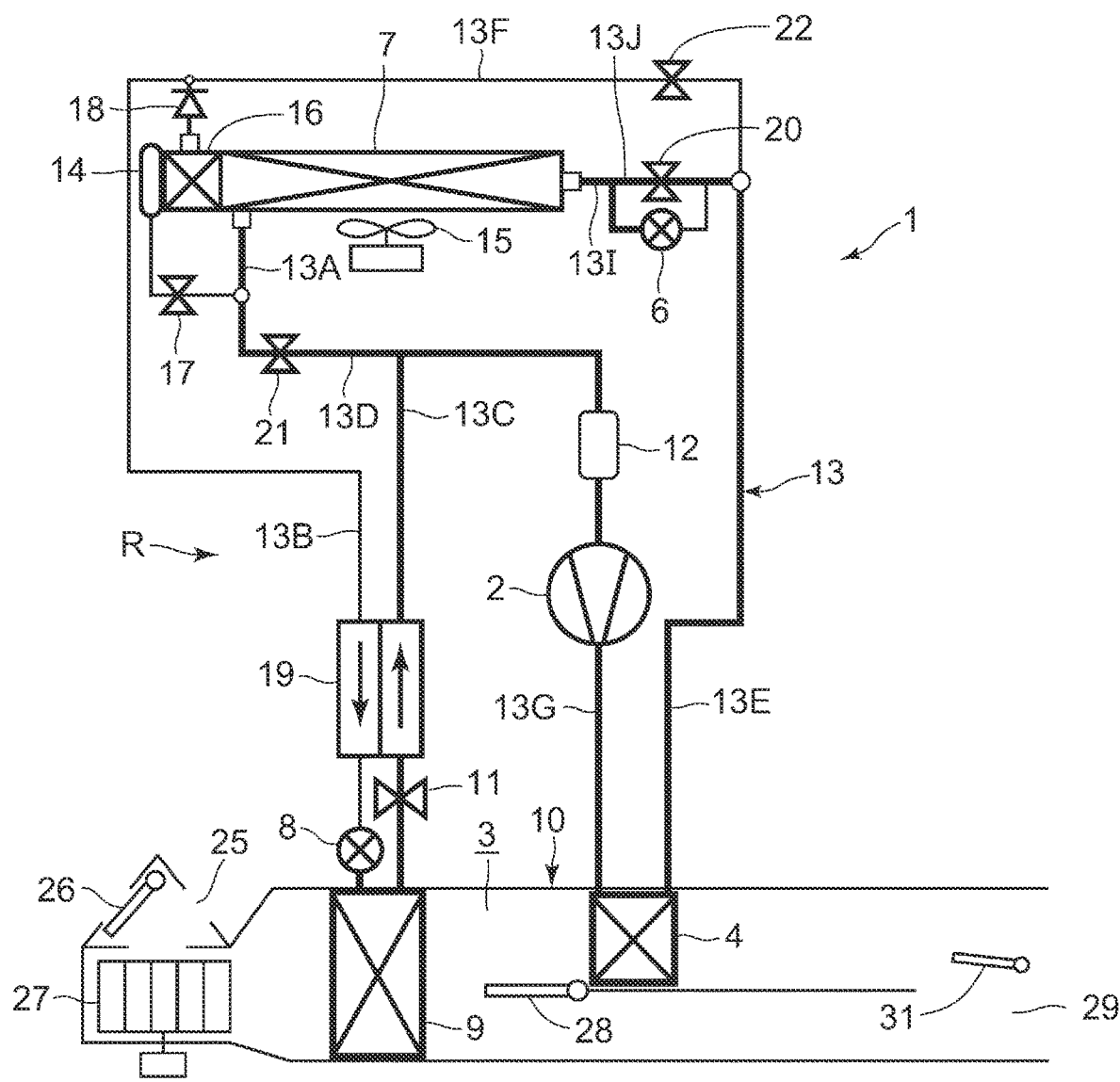
FIG. 1 is a constitutional view of an air conditioner for a vehicle of one embodiment to which the present invention is applied.

FIG. 1 shows a constitutional view of an air conditioner for a vehicle 1 of one embodiment of the present invention. The vehicle of the embodiment to which the present invention is applied is an electric vehicle (EV) in which an engine (an internal combustion engine) is not mounted, and runs with an electric motor for running which is driven by power charged in a battery (which is not shown in the drawing), and the air conditioner for the vehicle 1 of the present invention is also driven by the power of the battery. Specifically, in the electric vehicle which is not capable of performing heating by engine waste heat, the air conditioner for the vehicle 1 of the embodiment performs heating by a heat pump operation in which a refrigerant circuit is used, and furthermore, the conditioner selectively executes respective operation modes of dehumidifying and heating, dehumidifying and cooling, cooling and others.

It is to be noted that the vehicle is not limited to the electric vehicle, and the present invention is also effective for a so-called hybrid car in which the engine is used together with the electric motor for running. Furthermore, needless to say, the present invention is also applicable to a usual car which runs with the engine.

The air conditioner for the vehicle 1 of the embodiment performs air conditioning (heating, cooling, dehumidifying, and ventilation) of a vehicle interior of the electric vehicle, and there are successively connected, by a refrigerant pipe 13, an electric type of compressor 2 to compress a refrigerant, a radiator 4 disposed in an air flow passage 3 of an HVAC unit 10 in which vehicle interior air passes and circulates, to let the high-temperature high-pressure refrigerant discharged from the compressor 2 and flowing inside via a refrigerant pipe 13G radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve to decompress and expand the refrigerant, a heat absorber 9 disposed in the air flow passage 3 to let the refrigerant absorb heat from interior and exterior of the vehicle during the cooling and during the dehumidifying, an evaporation capability control valve 11 to control an evaporation capability in the heat absorber 9, an accumulator 12, and others, thereby constituting a refrigerant circuit R.

It is to be noted that an outdoor blower 15 is provided in the outdoor heat exchanger 7. The outdoor blower 15 forcibly passes the outdoor air through the outdoor heat exchanger 7 to perform the heat exchange between the outdoor air and the refrigerant, whereby the outdoor air passes through the outdoor heat exchanger 7 also during stopping of the vehicle (i.e., a velocity VSP is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve 17 for cooling as an opening/closing valve for the cooling which is to be opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11. It is to be noted that the evaporation capability control valve 11 may be disposed on a downstream side of the internal heat exchanger 19.

Additionally, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve 21 for heating as an opening/closing valve for the heating which is to be opened during the heating. In addition, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve 22 for dehumidifying as an opening/closing valve for the dehumidifying which is to be opened during the dehumidifying. That is, the solenoid valve 22 is connected in parallel with the outdoor heat exchanger 7.

Furthermore, the outdoor expansion valve 6 is connected in parallel with a bypass pipe 13J, and in the bypass pipe 13J, a solenoid valve 20 for bypass as an opening/closing valve for the bypass is interposed to open in a cooling mode so that the refrigerant bypasses the outdoor expansion valve 6 to flow. It is to be noted that a pipe between the outdoor expansion valve 6 and the solenoid valve 20, and the outdoor heat exchanger 7 is denoted with 13I.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in the air flow passage 3 on the air upstream side of the radiator 4, an air mix damper 28 is disposed to adjust a degree at which the indoor air or outdoor air flows through the radiator 4. Further in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
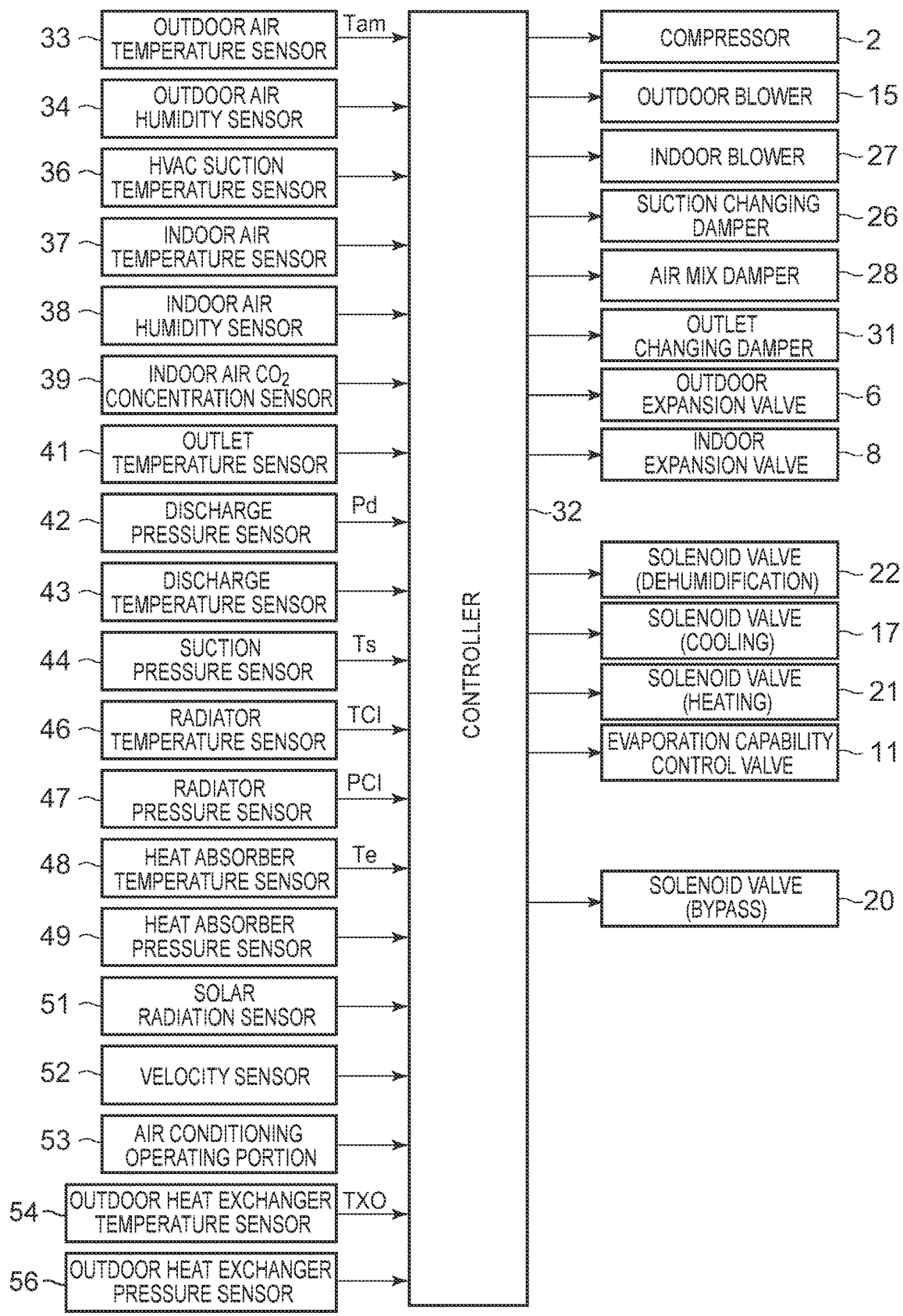
FIG. 2 is a block diagram of an electric circuit of a controller of the air conditioner for the vehicle of FIG. 1.

Next, in FIG. 2, 32 is a controller (ECU) as a control means constituted of a microcomputer, and an input of the controller 32 is connected to respective outputs of an outdoor air temperature sensor 33 which detects an outdoor air temperature Tam of the vehicle, an outdoor air humidity sensor 34 which detects an outdoor air humidity of the vehicle, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction temperature sensor 44 (a detecting means) which detect a temperature (a suction refrigerant temperature Ts: a detected value) of the refrigerant to be sucked into the compressor 2, a radiator temperature sensor 46 which detects a temperature of the radiator 4 (a radiator temperature TCI), a radiator pressure sensor 47 which detects a refrigerant pressure of the radiator 4 (a radiator pressure PCI), a heat absorber temperature sensor 48 which detects a temperature of the heat absorber 9 (a heat absorber temperature Te), a heat absorber pressure sensor 49 which detects a refrigerant pressure of the heat absorber 9, a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the operation mode, an outdoor heat exchanger temperature sensor 54 which detects a temperature (TXO) of the outdoor heat exchanger 7, and an outdoor heat exchanger pressure sensor 56 which detects a refrigerant pressure of the outdoor heat exchanger 7.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, and the evaporation capability control valve 11. Then, the controller 32 controls these components on the basis of the outputs of the respective sensors and the setting input by the air conditioning operating portion 53.

Next, description will be made as to an operation of the air conditioner for the vehicle 1 of the embodiment having the above constitution. The controller 32 changes and executes respective roughly divided operation modes of a heating mode, a dehumidifying and heating mode, an internal cycle mode, a dehumidifying and cooling mode, and the cooling mode. Initially, description will be made as to a flow of the refrigerant in each operation mode.

(1) Heating Mode

When the heating mode is selected by the controller 32 or a manual operation to the air conditioning operating portion 53, the controller 32 opens the solenoid valve 21 and closes the solenoid valve 17, the solenoid valve 22 and the solenoid valve 20. Then, the controller operates the compressor 2 and the respective blowers 15 and 27, and the air mix damper 28 has a state of passing the air blown out from the indoor blower 27 through the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4. On the other hand, the refrigerant in the radiator 4 is deprived of heat by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump and the outdoor heat exchanger 7 functions as the evaporator of the refrigerant. Then, the low-temperature refrigerant flowing out from the outdoor heat exchanger 7 flows through the refrigerant pipe 13A, the solenoid valve 21 and the refrigerant pipe 13D, and flows from the refrigerant pipe 13C into the accumulator 12 to perform gas-liquid separation, and the gas refrigerant is sucked into the compressor 2, thereby repeating this circulation. The air heated in the radiator 4 is blown out from the outlet 29, thereby performing the heating of the vehicle interior.

The controller 32 controls a number of revolution Nc of the compressor 2 on the basis of a high pressure of the refrigerant circuit R which is detected by the radiator pressure sensor 47, controls a valve position of the outdoor expansion valve 6 on the basis of the temperature (the radiator temperature TCI) of the radiator 4 which is detected by the radiator temperature sensor 46 and the refrigerant pressure (the radiator pressure PCI) of the radiator 4 which is detected by the radiator pressure sensor 47, and controls a subcool degree of the refrigerant in an outlet of the radiator 4.

Figure 3:
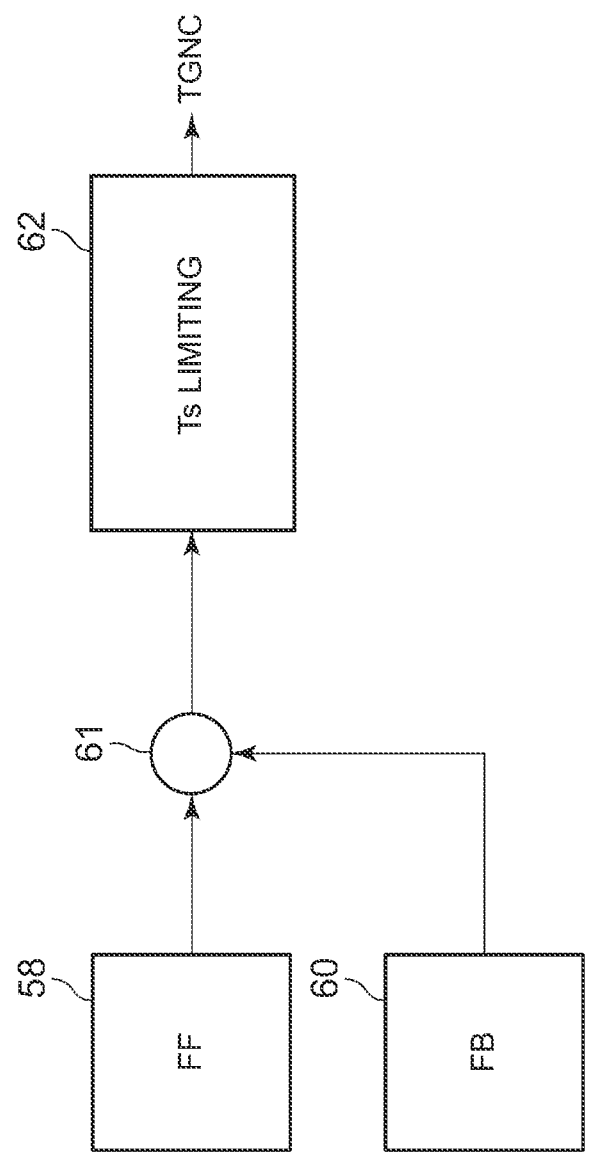
FIG. 3 is a control block diagram of control of a compressor number of revolution by the controller of FIG. 2 in a heating mode.

FIG. 3 is a control block diagram of the controller 32 which determines a target number of revolution (a compressor target number of revolution) TGNC of the compressor 2 for this heating mode. A feedforward (F/F) control amount calculation section 58 of the controller 32 calculates an F/F control amount TGNCff of the compressor target number of revolution on the basis of the outdoor air temperature Tam obtainable from the outdoor air temperature sensor 33, a blower voltage BLV of the indoor blower 27, an air mix damper position SW of the air mix damper 28 which is obtainable from SW=(TAO−Te)/(TH−Te), a target subcool degree TGSC that is a target value of a subcool degree SC in the outlet of the radiator 4, a radiator target temperature TCO that is a target value of the temperature of the radiator 4, and a radiator target pressure PCO that is a target value of the pressure of the radiator 4.

It is to be noted that TAO is a target outlet temperature that is a target value of the temperature of the air blown out from the outlet 29, TH is a temperature of the radiator 4 (a radiator temperature) which is obtainable from the radiator temperature sensor 46, Te is the temperature of the heat absorber 9 (the heat absorber temperature) which is obtainable from the heat absorber temperature sensor 48, and the air mix damper position SW changes in a range of $0 \leq SW \leq 1$. When a value of the position is 0, the air mix damper has an air mix shutoff state where the damper does not pass the air through the radiator 4, and when the value is 1, the air mix damper has an air mix full open state of passing all the air in the air flow passage 3 through the radiator 4.

The radiator target pressure PCO is calculated on the basis of the target subcool degree TGSC and the radiator target temperature TCO. Furthermore, a feedback (F/B) control amount calculation section 60 calculates an F/B control amount TGNCfb of the compressor target number of revolution on the basis of the radiator target pressure PCO and the radiator pressure PCI that is the refrigerant pressure of the radiator 4. Then, an adder 61 adds the F/F control amount TGNCff calculated by the F/F control amount calculation section 58 and the F/B control amount TGNCfb calculated by the F/B control amount calculation section 60, and this added value (TGNCff+TGNCfb) is limited by a low pressure protection control section 62 (a low pressure protecting function of the controller 32) and then determined as the compressor target number of revolution TGNC. In this heating mode, the controller 32 controls the number of revolution Nc of the compressor 2 on the basis of the compressor target number of revolution TGNC. It is to be noted that description will be made as to limiting control of the compressor target number of revolution TGNC for low pressure protection to be performed by the low pressure protection control section 62 later in detail.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior. The controller 32 controls the number of revolution Nc of the compressor 2 on the basis of the high pressure of the refrigerant circuit R which is detected by the radiator pressure sensor 47, and the controller controls the valve position of the outdoor expansion valve 6 on the basis of the temperature of the heat absorber 9 which is detected by the heat absorber temperature sensor 48.

(3) Internal Cycle Mode

Next, in the internal cycle mode, the controller 32 shuts off the outdoor expansion valve 6 in the above state of the dehumidifying and heating mode (a shut off position), and also closes the solenoid valves 20 and 21. The outdoor expansion valve 6 and the solenoid valves 20 and 21 are closed, thereby obstructing inflow of the refrigerant into the outdoor heat exchanger 7 and outflow of the refrigerant from the outdoor heat exchanger 7, and hence all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but the heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution Nc of the compressor 2 on the basis of the temperature of the heat absorber 9 or the above-mentioned high pressure of the refrigerant circuit R. At this time, the controller 32 selects a smaller compressor target number of revolution from compressor target numbers of revolution obtainable by calculations from the temperature of the heat absorber 9 and the high pressure, to control the compressor 2.

(4) Dehumidifying and Cooling Mode

Next, in the dehumidifying and cooling mode, the controller 32 opens the solenoid valve 17 and closes the solenoid valve 21, the solenoid valve 22 and the solenoid valve 20. Then, the controller operates the compressor 2 and the respective blowers 15 and 27, and the air mix damper 28 has the state of passing the air blown out from the indoor blower 27 through the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 is heated by the high-temperature refrigerant in the radiator 4, whereas the refrigerant in the radiator 4 is deprived of heat by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior. The controller 32 controls the number of revolution Nc of the compressor 2 on the basis of the temperature of the heat absorber 9 which is detected by the heat absorber temperature sensor 48, also controls the valve position of the outdoor expansion valve 6 on the basis of the above-mentioned high pressure of the refrigerant circuit R, and controls the refrigerant pressure of the radiator 4 (the radiator pressure PCI).

(5) Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is an upper limit of controlling)), and the air mix damper 28 has a state of controlling a volume of the air to be passed which includes a state where the air does not pass through the radiator 4. In consequence, the high-temperature high-pressure gas refrigerant discharged from the compressor 2 flows into the radiator 4. When the air in the air flow passage 3 does not pass through the radiator 4, the refrigerant only passes the radiator, and when the air passes through the radiator, the controller lets the refrigerant radiate heat in the air. The refrigerant flowing out from the radiator 4 flows through the refrigerant pipe 13E to reach the solenoid valve 20 and the outdoor expansion valve 6.

At this time, the solenoid valve 20 opens, and hence the refrigerant bypasses the outdoor expansion valve 6 to pass the bypass pipe 13J, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 or slightly passes the radiator, and is blown out from the outlet 29 to the vehicle interior, thereby performing cooling of the vehicle interior. In this cooling mode, the controller 32 controls the number of revolution Nc of the compressor 2 on the basis of the temperature of the heat absorber 9 which is detected by the heat absorber temperature sensor 48.

On startup, the controller 32 selects the operation mode on the basis of the outdoor air temperature Tam detected by the outdoor air temperature sensor 33 and the target outlet temperature TAO. Furthermore, after the startup, the controller selects and changes the above respective operation modes in accordance with changes of environments and predetermined conditions of the outdoor air temperature Tam, the target outlet temperature TAO and the like.

(6) Low Pressure Protection Control by Controller

Next, one example of control of low pressure protection by the controller 32 in the above-mentioned heating mode will be described with reference to FIG. 3 to FIG. 5. As described above, the low pressure protection control section 62 of the controller 32 limits the added value (TGNCff+TGNCfb) of the F/F control amount TGNCff calculated by the F/F control amount calculation section 58 and the amount TGNCfb calculated by the F/B control amount calculation section 60.

In this case, the low pressure protection control section 62 selects a smaller value (MIN) from values consisting of a value obtained by multiplying, by a predetermined gain, a difference (Ts−TGTs) obtained by subtracting a limiting target value TGTs for low pressure protection from the suction refrigerant temperature Ts that is a detected value detected by the suction temperature sensor 44 (the detecting means) and adding a previous compressor target number of revolution TGNCpst to the multiplied value, and the above added value (TGNCff+TGNCfb), to determine the selected value as the compressor target number of revolution TGNC.

Specifically, when the suction refrigerant temperature Ts is lower than the limiting target value TGTs, the value of the difference (Ts−TGTs) multiplied by the predetermined gain is necessarily minus, and hence the value obtained by adding the previous compressor target number of revolution TGNCpst to the value of this difference (Ts−TGTs) multiplied by the predetermined gain is smaller than the previous compressor target number of revolution TGNCpst. Then, when the value obtained by adding the previous compressor target number of revolution TGNCpst to the value of the difference (Ts−TGTs) multiplied by the predetermined gain is smaller than the added value (TGNCff+TGNCfb), the value is selected, and when the value is larger than the added value, the added value (TGNCff+TGNCfb) is selected. Therefore, in any case, the compressor target number of revolution TGNC decreases, when the suction refrigerant temperature Ts is lower than the limiting target value TGTs.

In consequence, the low pressure protection control section 62 of the controller 32 adjusts the number of revolution of the compressor 2 so that the suction refrigerant temperature Ts of the detected value detected by the suction temperature sensor 44 does not lower below the limiting target value TGTs (the low pressure protecting function), but furthermore, the controller 32 changes the limiting target value TGTs when starting the compressor 2 in the heating mode.

Figure 4:
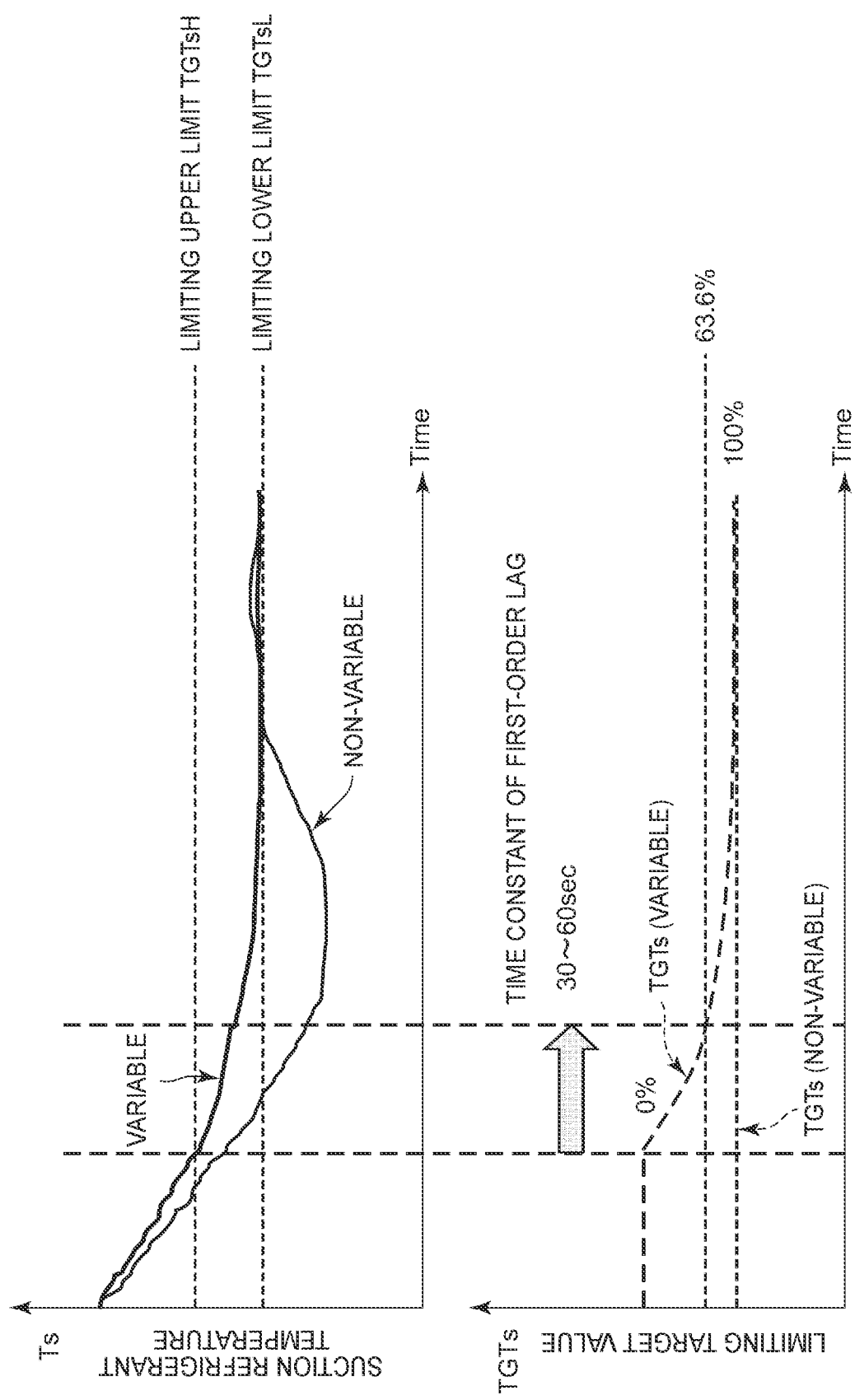
FIG. 4 is a diagram to explain low pressure protection control to be executed by the controller of FIG. 2 (Embodiment 1)
Figure 10:
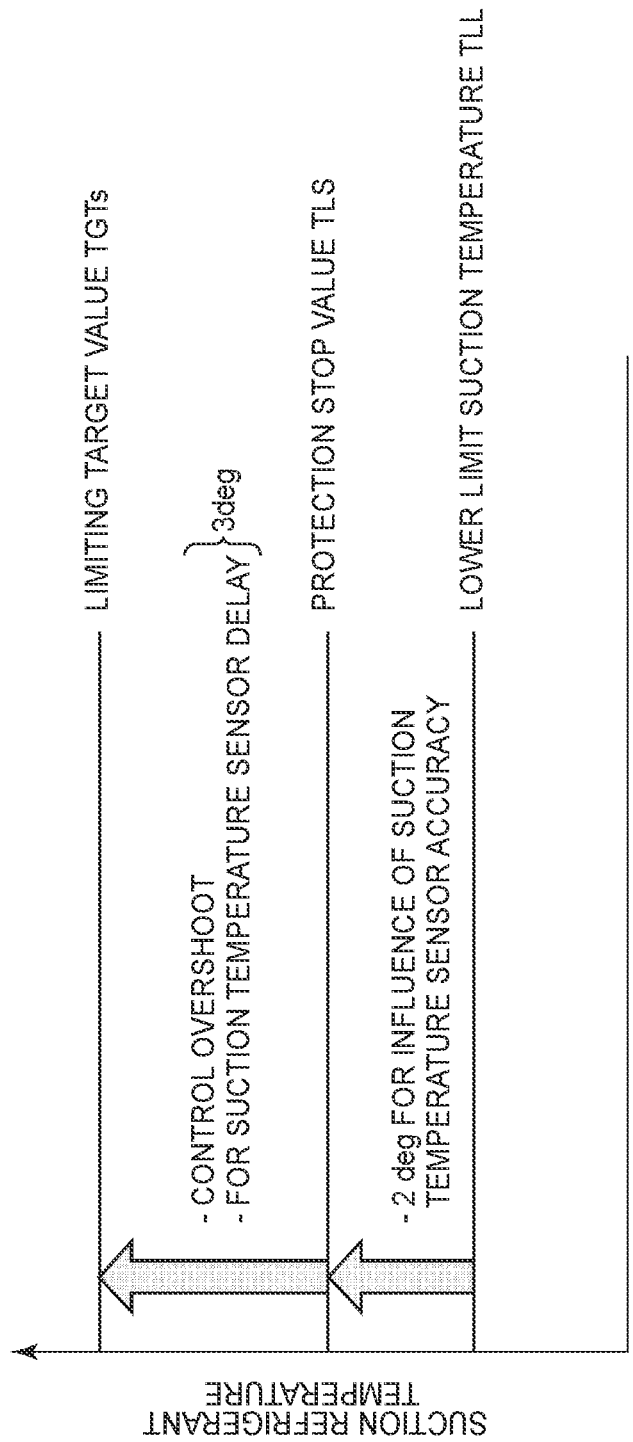
FIG. 10 is a diagram to explain conventional low pressure protection control.

FIG. 4 shows a conceptual diagram of such variable control of the limiting target value TGTs by the controller 32. In this case, the controller 32 has a predetermined limiting lower limit TGTsL (the above-mentioned conventional fixed value of the limiting target value TGTs of FIG. 10: TLS+3 deg.) and a limiting upper limit TGTsH (TGTsL+3 deg.) which is higher than this limiting lower limit TGTsL as much as a predetermined value (e.g., 3 deg.). On startup of the compressor 2, the controller initially adjusts the limiting target value TGTs to the limiting upper limit TGTsH. Therefore, on the startup of the compressor 2, the low pressure protection control section 62 limits the compressor target number of revolution TGNC so that the suction refrigerant temperature Ts detected by the suction temperature sensor 44 does not lower below this limiting upper limit TGTsH.

Then, when the suction refrigerant temperature Ts detected by the suction temperature sensor 44 lowers down to the limiting upper limit TGTsH (Ts=TGTsH), the controller 32 decreases the limiting target value TGTs toward the limiting lower limit TGTsL. In this case, when a range from the limiting upper limit TGTsH (0% of a broken line denoted with TGTs (variable) in a lower stage of FIG. 4) down to the limiting lower limit TGTsL is defined as 100% (a broken line denoted with TGTs (non-variable) in the lower stage of FIG. 4), for example, the controller 32 decreases the limiting target value TGTs down to 63.6% in 30 seconds to 60 seconds with a time constant of a first-order lag as shown by the broken line denoted with TGTs (variable) in the lower stage of FIG. 4.

Figure 5:
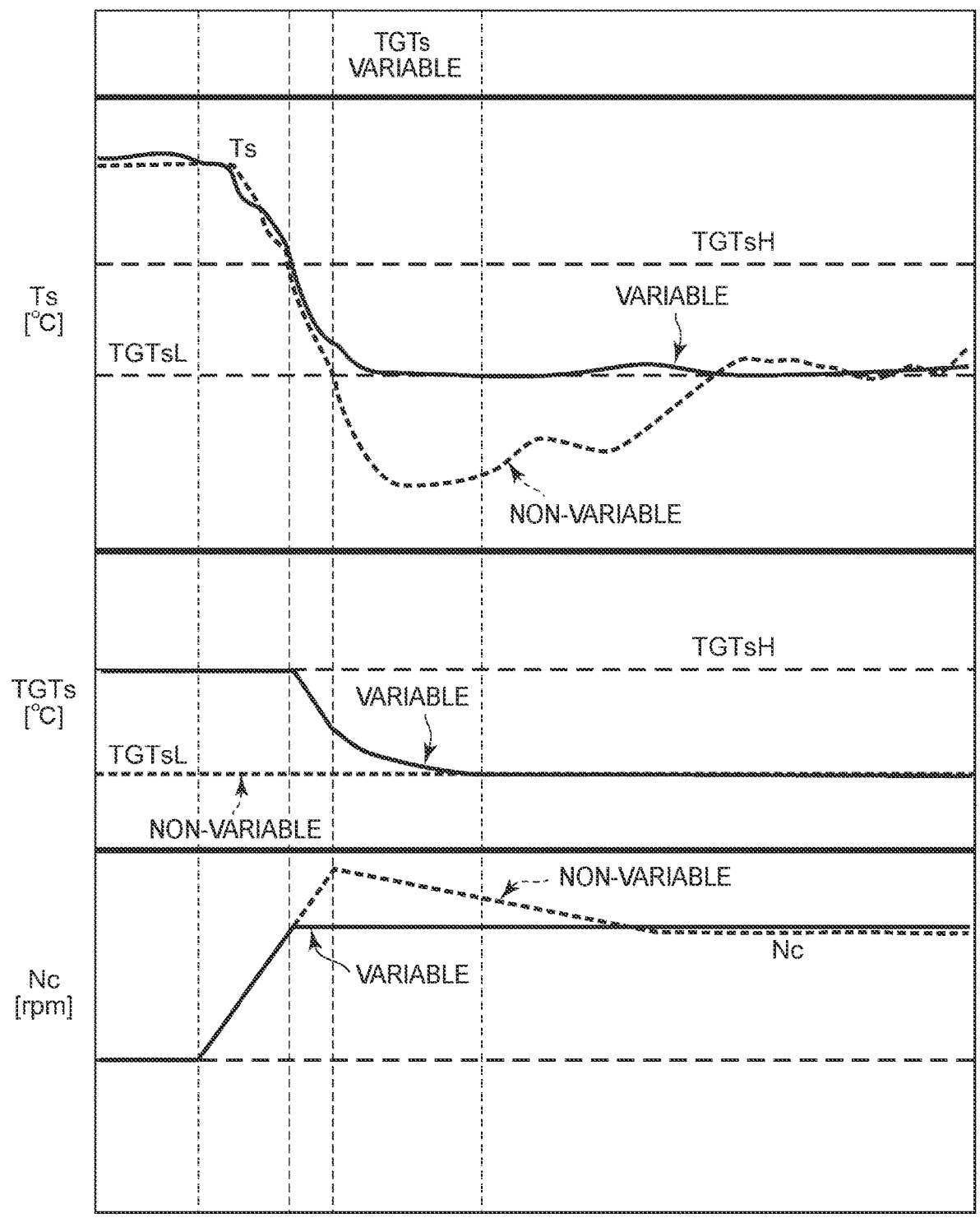
FIG. 5 is a timing chart to explain the low pressure protection control of FIG. 4.

It is to be noted that an upper stage of FIG. 4 and an uppermost stage of FIG. 5 show changes of the suction refrigerant temperature Ts detected by the suction temperature sensor 44, and the lower stage of FIG. 4 and a middle stage of FIG. 5 show changes of the above-mentioned limiting target value TGTs. Furthermore, a solid line (variable) of a lowermost stage of FIG. 5 shows a change of the number of revolution Nc of the compressor 2 by such variable control of the limiting target value TGTs.

When the limiting target value TGTs is fixed to TLS+3 deg. as in the conventional control (FIG. 10), the number of revolution Nc of the compressor 2 increases rapidly from the startup due to response delay of the suction temperature sensor 44 as shown by a non-variable range (a broken line) in FIG. 5, and hence the suction refrigerant temperature Ts noticeably lowers below the limiting lower limit TGTsL in each drawing as shown by the non-variable ranges in FIG. 4 and FIG. 5. In consequence, there occurs so-called overshoot in which a temperature of the refrigerant to be actually sucked into the compressor 2 lowers more noticeably than the suction refrigerant temperature Ts.

On the other hand, as in the embodiment, the controller limits the number of revolution Nc of the compressor 2 so that the limiting target value TGTs is the limiting upper limit TGTsH, from early on the startup of the compressor 2, and then gradually decreases the limiting target value TGTs toward the limiting lower limit TGTsL. Consequently, as shown by the solid line (variable) in FIG. 5, the number of revolution Nc of the compressor 2 is limited from the time when the suction refrigerant temperature Ts lowers to the limiting upper limit TGTsH, and the number of revolution does not rapidly increase. In consequence, the suction refrigerant temperature Ts also gently lowers as shown in a variable range in each drawing, and the temperature of the refrigerant to be actually sucked into the compressor 2 also similarly gently lowers, thereby eliminating or effectively inhibiting the overshoot. Then, the suction refrigerant temperature Ts detected by the suction temperature sensor 44 and the temperature of the refrigerant to be actually sucked into the compressor 2 finally converge to the limiting lower limit TGTsL (FIG. 4 and FIG. 5).

In this way, according to this embodiment, the controller 32 has the low pressure protecting function of adjusting the number of revolution Nc of the compressor 2 so that the suction refrigerant temperature Ts (the detected value) does not lower below the limiting target value TGTs, on the basis of the suction refrigerant temperature Ts that is the detected value of the suction temperature sensor 44 and the limiting target value TGTs set to the temperature of the refrigerant to be sucked into the compressor 2 (the sucked refrigerant temperature), and the controller has the predetermined limiting lower limit TGTsL and the predetermined limiting upper limit TGTsH which is higher than the predetermined limiting lower limit, and adjusts the number of revolution Nc of the compressor 2 so that the limiting target value TGTs is the limiting upper limit TGTsH on the startup of the compressor 2, and the controller gradually decreases the limiting target value TGTs toward the limiting lower limit TGTsL, when the suction refrigerant temperature Ts (the detected value) lowers to the limiting upper limit TGTsH. Consequently, by setting the limiting lower limit TGTsL to the above-mentioned conventional value (TLS+3 deg.) of the limiting target value, the controller 32 adjusts the number of revolution Nc of the compressor 2 under setting the limiting target value TGTs to the limiting upper limit TGTsH which is higher than the limiting lower limit on the startup of the compressor 2.

In consequence, the low pressure protection starts in a stage which is earlier than that in the conventional technology, and hence it is possible to effectively inhibit so-called overshoot of the actual suction refrigerant temperature due to the response delay of the suction temperature sensor 44, and reliability of the compressor 2 and low pressure side components can improve. Furthermore, the controller 32 gradually decreases the limiting target value TGTs toward the limiting lower limit TGTsL, when the suction refrigerant temperature Ts (the detected value) lowers to the limiting upper limit TGTsH. Therefore, accurate low pressure protection is achievable without unnecessarily limiting the number of revolution of the compressor 2.

In this case, the controller 32 decreases the limiting target value TGTs down to the limiting lower limit TGTsL with the predetermined time constant of the first-order lag, when the suction refrigerant temperature Ts (the detected value) lowers to the limiting upper limit TGTsH. Consequently, it is possible to accurately decrease the limiting target value TGTs in accordance with drop of the temperature of the refrigerant to be actually sucked into the compressor 2 (the sucked refrigerant temperature).

Embodiment 2

Figure 6:
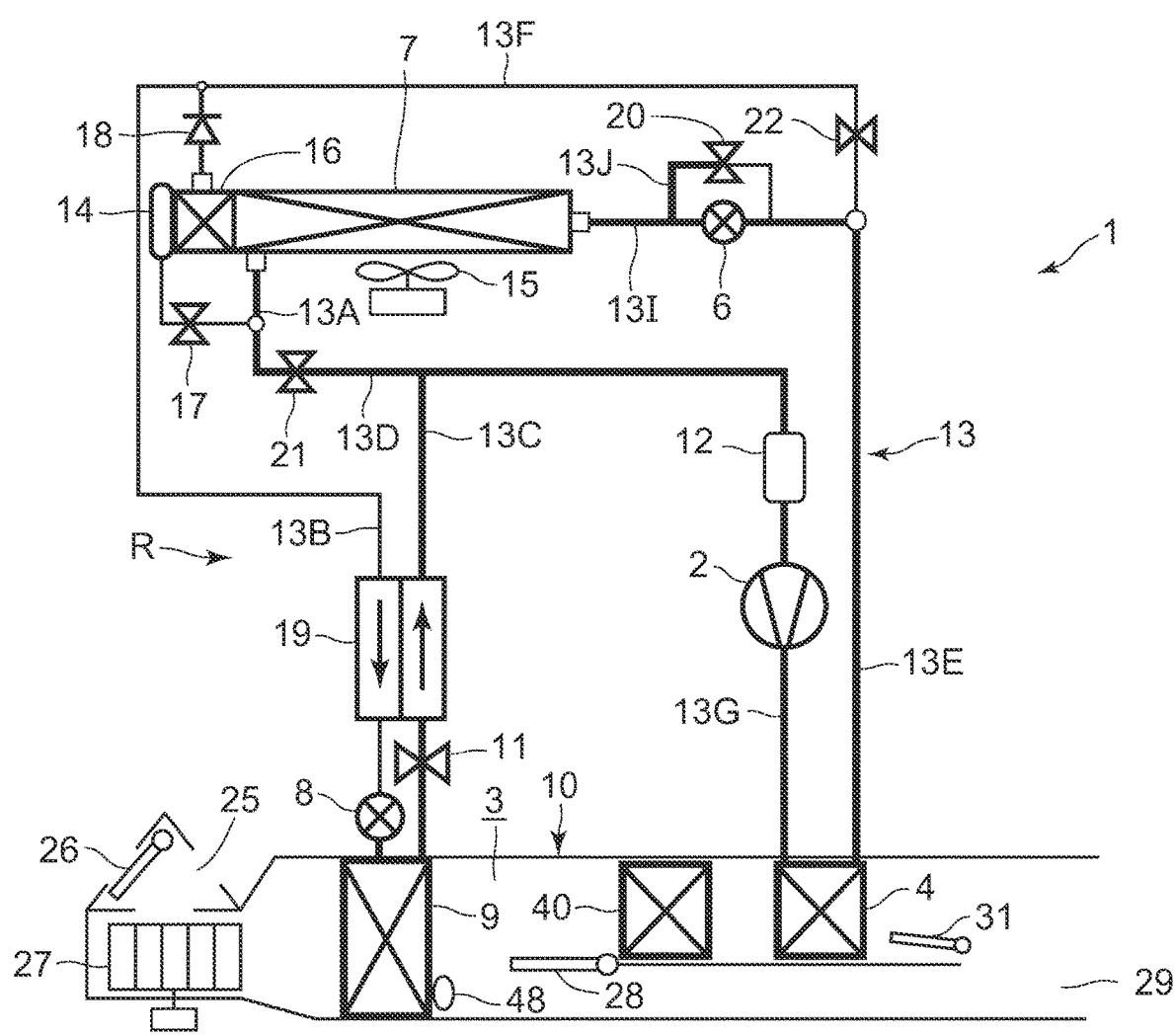
FIG. 6 is a constitutional view of an air conditioner for a vehicle of another embodiment to which the present invention is applied (Embodiment 2)

Next, description will be made as to a constitutional view of an air conditioner for a vehicle 1 of another embodiment of the present invention and low pressure protection control by a controller 32 in this case, with reference to FIG. 6 and FIG. 7. It is to be noted that in FIG. 6, components denoted with the same reference numerals as in FIG. 1 perform the same or similar functions. In this case, an auxiliary heat source 40 is provided as auxiliary heating means on an upstream side (an air upstream side) of a radiator 4 to a flow of air in an air flow passage 3. This auxiliary heat source 40 is constituted of a PTC heater (an electric heater) in the embodiment.

When a heating capability by the radiator 4 runs short in a heating mode, the controller 32 conventionally lets the auxiliary heat source 40 generate heat (operates), and heats the air in the air flow passage 3 which flows into the radiator 4, to complement the heating capability of the radiator 4, thereby contributing to heating of a vehicle interior, but in this invention, the controller also operates the auxiliary heat source 40 on startup of a compressor 2.

Figure 7:
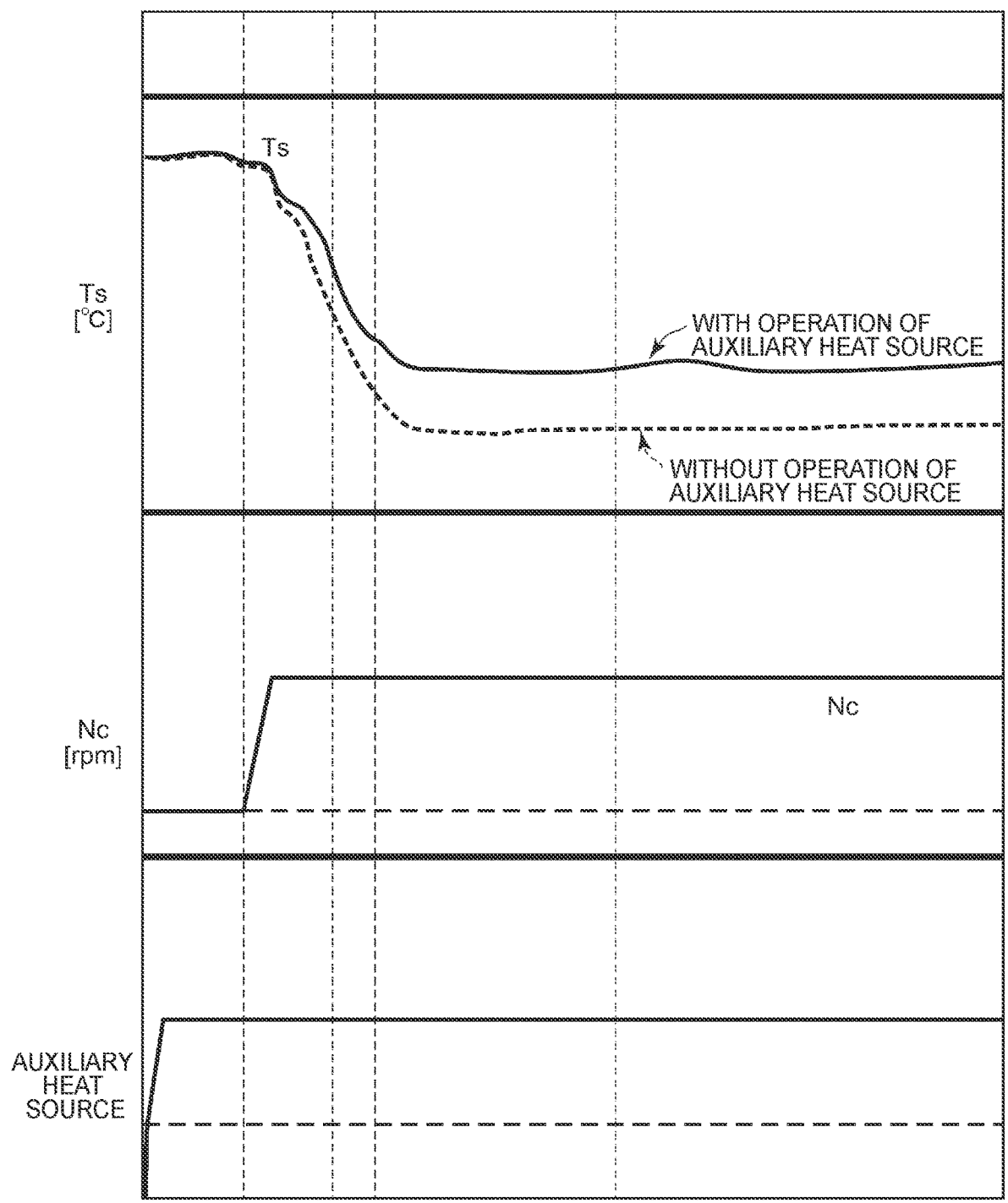
FIG. 7 is a timing chart to explain low pressure protection control to be executed by a controller in the air conditioner for the vehicle of FIG. 6.

FIG. 7 shows a timing chart of a suction refrigerant temperature Ts detected by a suction temperature sensor 44 and a number of revolution Nc of the compressor 2, and an operating state of the auxiliary heat source 40 in this case. According to the embodiment, in the case of starting the compressor 2 in the heating mode, the controller 32 initially heats (operates) the auxiliary heat source 40 prior to the startup of the compressor 2, and an indoor blower 27 also starts its operation. Afterward, the controller 32 starts the compressor 2, but in this case, the air flowing into the radiator 4 is heated by the auxiliary heat source 40, to raise a temperature of the air, so that a high pressure of a refrigerant circuit R rises and a low pressure also rise.

Furthermore, the number of revolution Nc of the compressor 2 does not rapidly increase due to rise of a radiator pressure PCI (shown in a middle stage of FIG. 7), and hence the suction refrigerant temperature Ts on the startup of the compressor 2 also does not rapidly lower. A solid line in uppermost stage of FIG. 7 shows the suction refrigerant temperature Ts in the case of heating the auxiliary heat source 40 (with the operation of the auxiliary heat source), and a broken line therein shows a change of the suction refrigerant temperature Ts in a case where the auxiliary heat source is not heated (without the operation of the auxiliary heat source). When the auxiliary heat source 40 is not heated, as shown by the broken line, the suction refrigerant temperature Ts and a temperature (a sucked refrigerant temperature) of the refrigerant to be actually sucked into the compressor 2 noticeably lower and overshoot, but when the auxiliary heat source 40 is heated, the suction refrigerant temperature Ts gently lowers after the startup of the compressor 2, and the temperature (the sucked refrigerant temperature) of the refrigerant to be actually sucked into the compressor 2 also does not overshoot.

It is to be noted that when the complementation of the heating by the auxiliary heat source 40 is not necessary, the controller 32 stops the heating of the auxiliary heat source 40 in a state where the suction refrigerant temperature Ts is stable. Furthermore, in Embodiment 2 mentioned above, the controller starts the heating of the auxiliary heat source 40 and then starts the compressor 2, but may start the operation of the auxiliary heat source 40 simultaneously with the startup of the compressor 2.

Furthermore, the low pressure protection control of Embodiment 1 mentioned above may be combined with the operation of the auxiliary heat source 40 of Embodiment 2. Specifically, on the startup of the compressor 2 in the heating mode, when the controller starts the compressor 2 while heating the auxiliary heat source 40 in addition to execution of variable control of a limiting target value TGTs, it is possible to further effectively inhibit so-called overshoot of the actual suction refrigerant temperature, and reliability of the compressor 2 and low pressure side components can improve.

Embodiment 3

Alternatively, in addition to the low pressure protection control by the variable control of the limiting target value TGTs of Embodiment 1 mentioned above and the low pressure protection control by the operation of the auxiliary heat source 40 of Embodiment 2, or separately from such control, a controller 32 may decrease an upper limit number of revolution of controlling of a compressor 2, i.e., a upper limit number of revolution TGNCh of a compressor target number of revolution TGNC for a predetermined time after the startup of the compressor 2 or when a high pressure (a radiator pressure PCI) is lower than a predetermined value.

When the upper limit number of revolution TGNCh of the compressor target number of revolution TGNC is decreased, a number of revolution Nc of the compressor 2 does not excessively increase due to feedback control by the above-mentioned F/B control amount calculation section 60, on the startup of the compressor 2 or when the high pressure is low. Consequently, it is possible to eliminate the disadvantage that a temperature of a refrigerant to be sucked into the compressor 2 (a sucked refrigerant temperature) rapidly drops below the above-mentioned limiting target value TGTs, and improvement of reliability is achievable.

Embodiment 4

Figure 8:
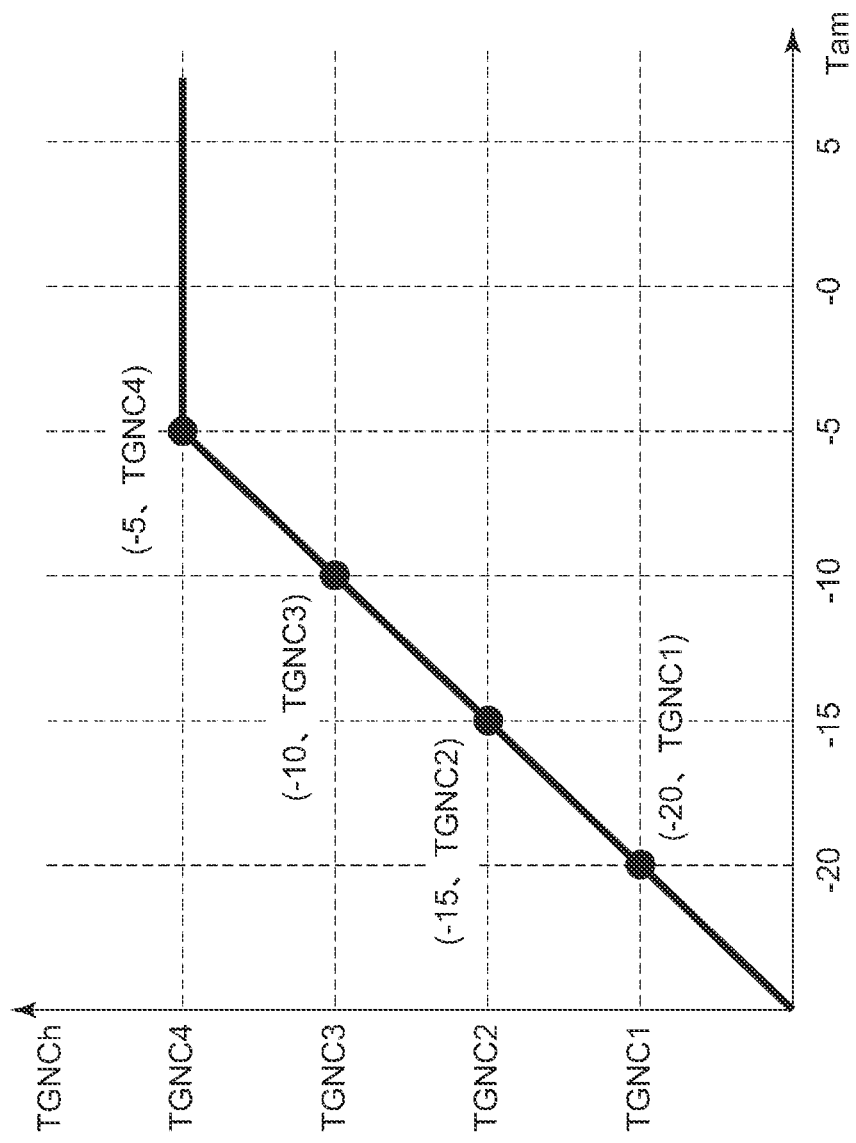
FIG. 8 is a diagram to explain another example of the low pressure protection control to be executed by the controller of FIG. 2 (Embodiment 4)

Next, FIG. 8 is a diagram showing still another example of low pressure protection control to be executed by a controller 32. It is to be noted that as a constitution of an air conditioner for a vehicle 1 of a target, a constitution of FIG. 1 is effective and a constitution of FIG. 6 is also effective. FIG. 8 shows revolution number limiting data possessed by the controller 32, and the data indicating a relation between an outdoor air temperature Tam detected by an outdoor air temperature sensor 33 and an upper limit number of revolution of controlling of a compressor 2, i.e., an upper limit number of revolution TGNCh of a compressor target number of revolution TGNC.

This revolution number limiting data indicates the relation between the outdoor air temperature Tam and the upper limit number of revolution TGNCh at which a suction refrigerant temperature Ts does not lower below a limiting target value TGTs corresponding to the above-mentioned limiting lower limit TGTsL when the compressor 2 operates at the outdoor air temperature Tam, and the relation is beforehand obtained by experiments. In the drawing, (−20, TGNC1) means that when the outdoor air temperature Tam is, for example, −20° C., the controller adjusts the upper limit number of revolution TGNCh to TGNC1, and hence the suction refrigerant temperature Ts does not lower below the limiting target value TGTs.

Similarly, (−15, TGNC2) means that when the outdoor air temperature Tam is, for example, −15° C., the controller adjusts the upper limit number of revolution TGNCh to TGNC2, and hence the suction refrigerant temperature Ts does not lower below the limiting target value TGTs; (−10, TGNC3) means that when the outdoor air temperature Tam is, for example, −10° C., the controller adjusts the upper limit number of revolution TGNCh to TGNC3, and hence the suction refrigerant temperature Ts does not lower below the limiting target value TGTs; and (−5,TGNC4) means that when the outdoor air temperature Tam is, for example, −5° C., the controller adjusts the upper limit number of revolution TGNCh to TGNC4, and hence the suction refrigerant temperature Ts does not lower below the limiting target value TGTs. It is to be noted that there is the tendency that TGNC1<TGNC2<TGNC3<TGNC4.

Then, when the controller 32 starts the compressor 2 in the heating mode, the controller extracts the upper limit number of revolution TGNCh corresponding to the outdoor air temperature Tam at this time from the outdoor air temperature Tam detected by the outdoor air temperature sensor 33 with reference to this revolution number limiting data, to change the upper limit number of revolution of controlling to the upper limit number of revolution TGNCh. Then, when the controller calculates the compressor target number of revolution TGNC, the controller suppresses TGNC at the changed upper limit number of revolution TGNCh.

Thus, in this embodiment, the controller changes the upper limit number of revolution TGNCh of the compressor 2 on the basis of the outdoor air temperature Tam, and hence the controller can change the upper limit number of revolution TGNCh of the compressor 2 in accordance with the outdoor air temperature Tam so that the suction refrigerant temperature Ts does not lower below the limiting target value TGTs. Consequently, improvement of reliability is achievable.

It is to be noted that also in this case, the above-mentioned low pressure protection control of Embodiment 1 may be combined with the changing control of the upper limit number of revolution TGNCh. That is, on the startup of the compressor 2 in the heating mode, the controller executes the variable control of the limiting target value TGTs, and additionally, the controller also changes the upper limit number of revolution TGNCh of the compressor 2 in accordance with the outdoor air temperature Tam. Consequently, it is possible to further effectively inhibit so-called overshoot of an actual suction refrigerant temperature, and reliability of the compressor 2 and low pressure side components can improve. However, in this case, for the revolution number limiting data, there is obtained, by the experiments, the relation between the outdoor air temperature Tam and the upper limit number of revolution TGNCh at which the suction refrigerant temperature Ts does not lower below the above-mentioned limiting lower limit TGTsL when the compressor 2 operates at the outdoor air temperature Tam.

Embodiment 5

Figure 9:
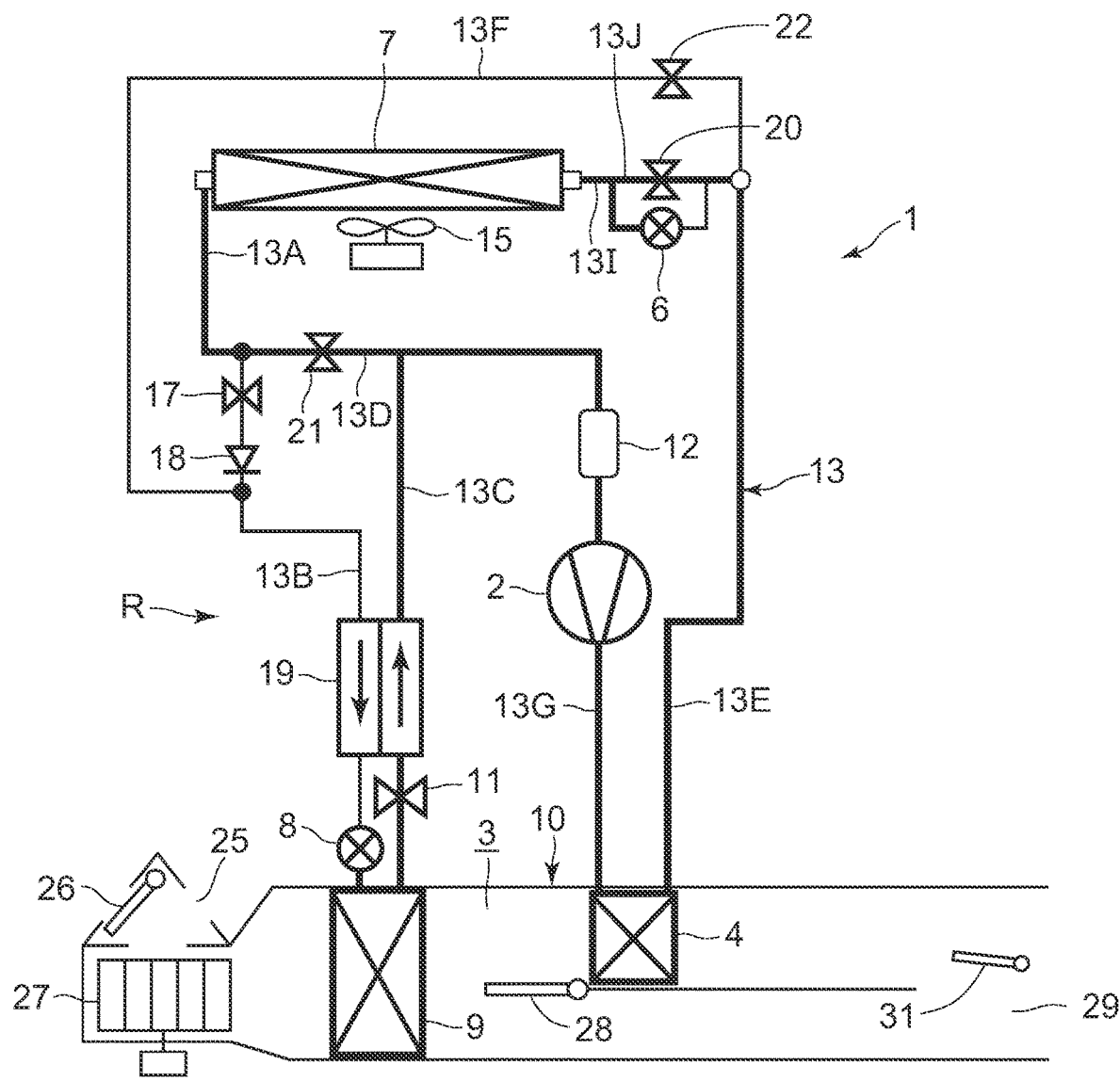
FIG. 9 is a constitutional view of an air conditioner for a vehicle of still another embodiment to which the present invention is applied (Embodiment 5)

Next, FIG. 9 shows another constitutional view of an air conditioner for a vehicle 1 of the present invention. In this embodiment, a receiver drier portion 14 and a subcooling portion 16 are not provided in an outdoor heat exchanger 7, and a refrigerant pipe 13A extending out from the outdoor heat exchanger 7 is connected to a refrigerant pipe 13B via a solenoid valve 17 and a check valve 18. Furthermore, a refrigerant pipe 13D branching from the refrigerant pipe 13A is similarly connected to a refrigerant pipe 13C on a downstream side of an internal heat exchanger 19 via a solenoid valve 21.

The other constitution is similar to the example of FIG. 1. The present invention is also effective in the air conditioner for the vehicle 1 of a refrigerant circuit R where there is employed the outdoor heat exchanger 7 which does not have the receiver drier portion 14 and the subcooling portion 16 in this manner.

It is to be noted that in the above respective embodiments, the suction refrigerant temperature Ts detected by the suction temperature sensor 44 which detects the temperature of the refrigerant to be sucked into the compressor 2 is converted to the pressure to execute the low pressure protection control, but when a suction pressure sensor which detects a pressure of the refrigerant to be sucked into the compressor 2 is provided, the low pressure protection control may directly be achieved with a suction refrigerant pressure. In this case, the above-mentioned suction refrigerant temperature Ts of each embodiment is replaced with a suction refrigerant pressure Ps detected by the suction pressure sensor, and the respective values of the limiting target value TGTs, the limiting upper limit TGTsH and the limiting lower limit TGTsL are replaced with respective pressure values of a limiting target value TGPs, a limiting upper limit TGPsH, and a limiting lower limit TGPsL.

Furthermore, the constitution of the refrigerant circuit R or each numeric value described above in each embodiment does not restrict the present invention, and is changeable without departing from the gist of the present invention.

DESCRIPTION OF REFERENCE NUMERALS 1 air conditioner for a vehicle
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve (opening/closing valve)
26 suction changing damper
27 indoor blower (a blower fan)
28 air mix damper
32 controller (a control means)
44 suction temperature sensor
R refrigerant circuit

The invention claimed is:

1. An air conditioner for a vehicle, comprising:
a compressor to compress a refrigerant,
an air flow passage through which air to be supplied to a vehicle interior flows,
a radiator disposed in the air flow passage to let the refrigerant radiate heat, thereby heating the air to be supplied to the vehicle interior,
an outdoor heat exchanger disposed outside the vehicle interior to let the refrigerant absorb heat,
one selected from the group consisting of: (a) a suction refrigerant temperature detector configured to detect a suction refrigerant temperature of the compressor, and (b) a suction refrigerant pressure detector configured to detect a suction refrigerant pressure of the compressor, and
a controller,
wherein the controller lets the refrigerant discharged from the compressor radiate heat in the radiator, and decompresses the refrigerant from which the heat has been radiated, to let the refrigerant absorb heat in the outdoor heat exchanger, thereby heating the vehicle interior;
wherein the controller has a low pressure protecting function of adjusting a number of revolutions of the compressor so that a detected value of the detector does not decrease below a limiting target value of the suction refrigerant temperature or the suction refrigerant pressure of the compressor, on the basis of the detected value of the detector and the limiting target value,
the controller has a predetermined limiting lower limit and a predetermined limiting upper limit which is higher than the predetermined limiting lower limit, and adjusts the number of revolutions of the compressor setting the limiting target value as the limiting upper limit on startup of the compressor, and
the controller gradually decreases the limiting target value toward the limiting lower limit, when the detected value decreases to the limiting upper limit.

2. The air conditioner for the vehicle according to claim 1,
wherein the gradual decreasing by the controller decreases the limiting target value down to the limiting lower limit using a predetermined time constant of a first-order lag.

3. The air conditioner for the vehicle according to claim 1, comprising:
an auxiliary heater disposed on an upstream side of the radiator to the flow of the air in the air flow passage,
wherein the controller lets the auxiliary heater generate heat on the startup of the compressor.

4. The air conditioner for the vehicle according to claim 1,
wherein the controller has revolution number limiting data indicating a relation between an outdoor air temperature and an upper limit number of revolutions of the compressor at which the suction refrigerant temperature or the suction refrigerant pressure does not lower below the limiting lower limit at the outdoor air temperature, and
the controller changes the upper limit number of revolutions of the compressor on the basis of the outdoor air temperature with reference to the revolution number limiting data.

5. The air conditioner for the vehicle according to claim 1,
wherein the controller decreases an upper limit number of revolutions of the compressor for a predetermined time after the startup of the compressor or when a high pressure is low.

* * * * *